United States Patent [19]
Youngner

[11] Patent Number: 6,031,944
[45] Date of Patent: Feb. 29, 2000

[54] HIGH TEMPERATURE RESONANT INTEGRATED MICROSTRUCTURE SENSOR

[75] Inventor: Daniel W. Youngner, Maple Grove, Minn.

[73] Assignee: Honeywell Inc., Minneapolis, Minn.

[21] Appl. No.: 08/999,165

[22] Filed: Dec. 30, 1997

[51] Int. Cl.[7] .................................................. G02B 6/00
[52] U.S. Cl. ................................ 385/12; 385/32; 385/30
[58] Field of Search .................................. 385/12, 6, 5, 7, 385/8, 9, 32, 31, 73

[56] References Cited

U.S. PATENT DOCUMENTS

| | | |
|---|---|---|
| 5,417,115 | 5/1995 | Burns . |
| 5,458,000 | 10/1995 | Burns et al. . |
| 5,511,427 | 4/1996 | Burns . |
| 5,550,516 | 8/1996 | Burns et al. . |
| 5,559,358 | 9/1996 | Burns et al. ............................ 257/431 |

*Primary Examiner*—Phan T. H. Palmer
*Attorney, Agent, or Firm*—John G. Shudy, Jr.

[57] ABSTRACT

A very high temperature microbeam sensor of a resonant integrated microstructure having an electrostatic beam driver and an optical fiber pick-up for sensed light from the beam. The high temperature sensor has no components that are vulnerable to temperatures up to 600 degrees C. Associated components for detection, processing and driving are remote from the sensor environment. By using different materials in the beam assembly, such as tungsten for the beam, and sapphire for the substrate and the shell, the sensor can withstand temperatures up to 1000 degrees C. Also, optical fiber may be used for long distance connections between processing electronics and the driver in the sensing device, by locating a photo detector just outside the very or ultra high temperature sensing environment, and then using optical fiber for sending long distance signals from the processor to the driver photo detector, for eliminating electrical signal-to-noise problems.

22 Claims, 7 Drawing Sheets

HIGH TEMPERATURE RESONANT INTEGRATED MICROSTRUCTURE SENSOR

BACKGROUND

The present invention pertains to resonant integrated microstructure (RIM) sensors, and particularly to high temperature resonant integrated microbeam sensor.

Figure 1:
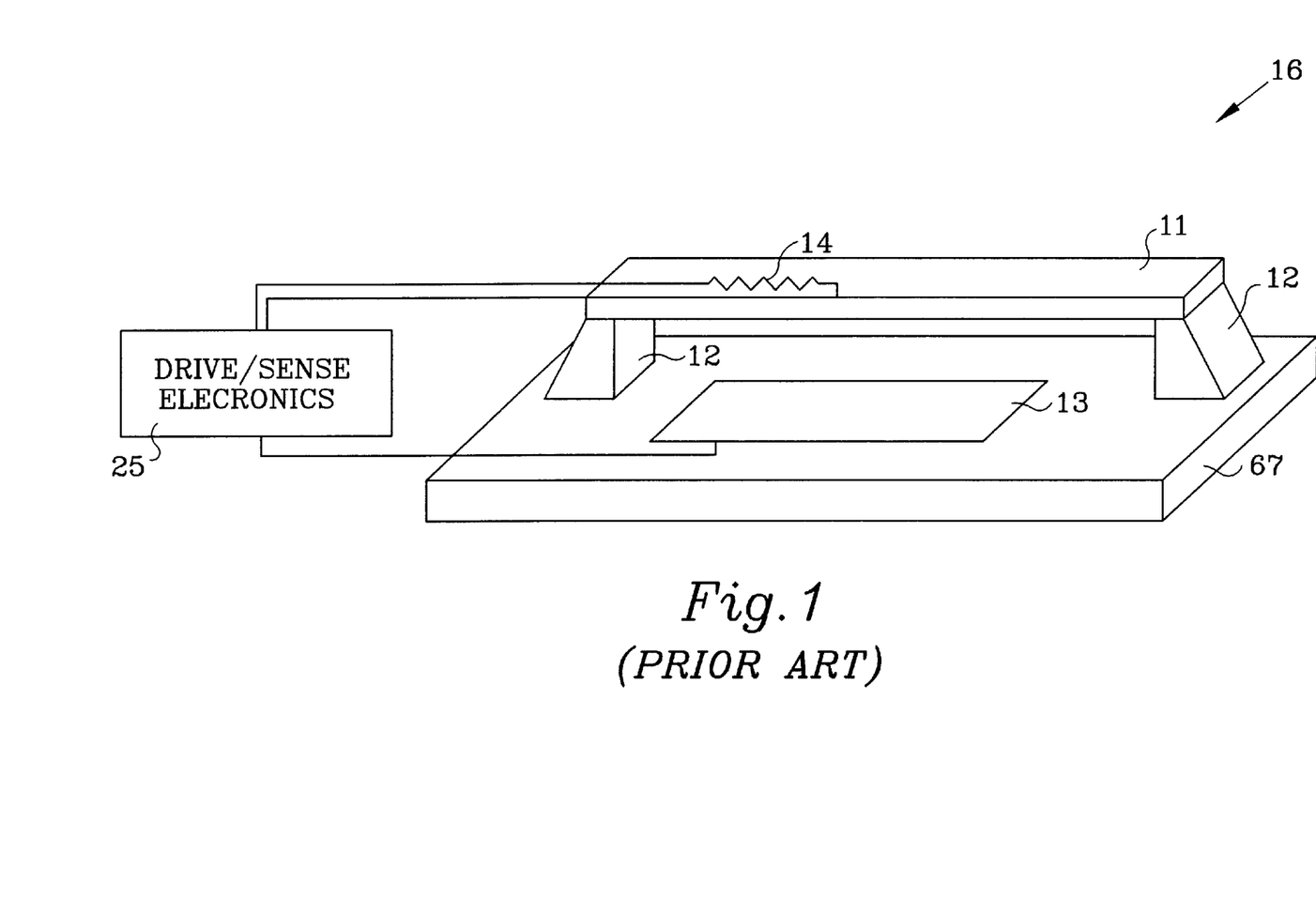
FIG. 1 shows a conventional electrical RIMS sensor.

An electrical RIMS sensor is shown in FIG. 1. Microbeam 11 vibrates at a resonant frequency of its structure. Beam 11 is supported by posts 12 which are a part of a micromachined silicon-based device 16. Beam 11 is driven electrostatically by a capacitive plate 13 which is proximate to the center of the beam and electrostatically causes the beam to flex or vibrate in a direction towards and away from capacitor 13. Sensing of the frequency of beam 11 is performed by a piezoresistor 14 embedded in beam 11. Drive/sense electronics 25 provide electrical signals to capacitive plate 13 for driving beam 11 and receive electronic signals from sensor 14 which are processed to indicate the frequency of beam 11. One disadvantage of a sensor 16 is that it cannot function well at temperatures above 200 degrees Centigrade (C.). For example, piezoresistor sensors fail at temperatures less than 250 degrees C.

Figure 2:
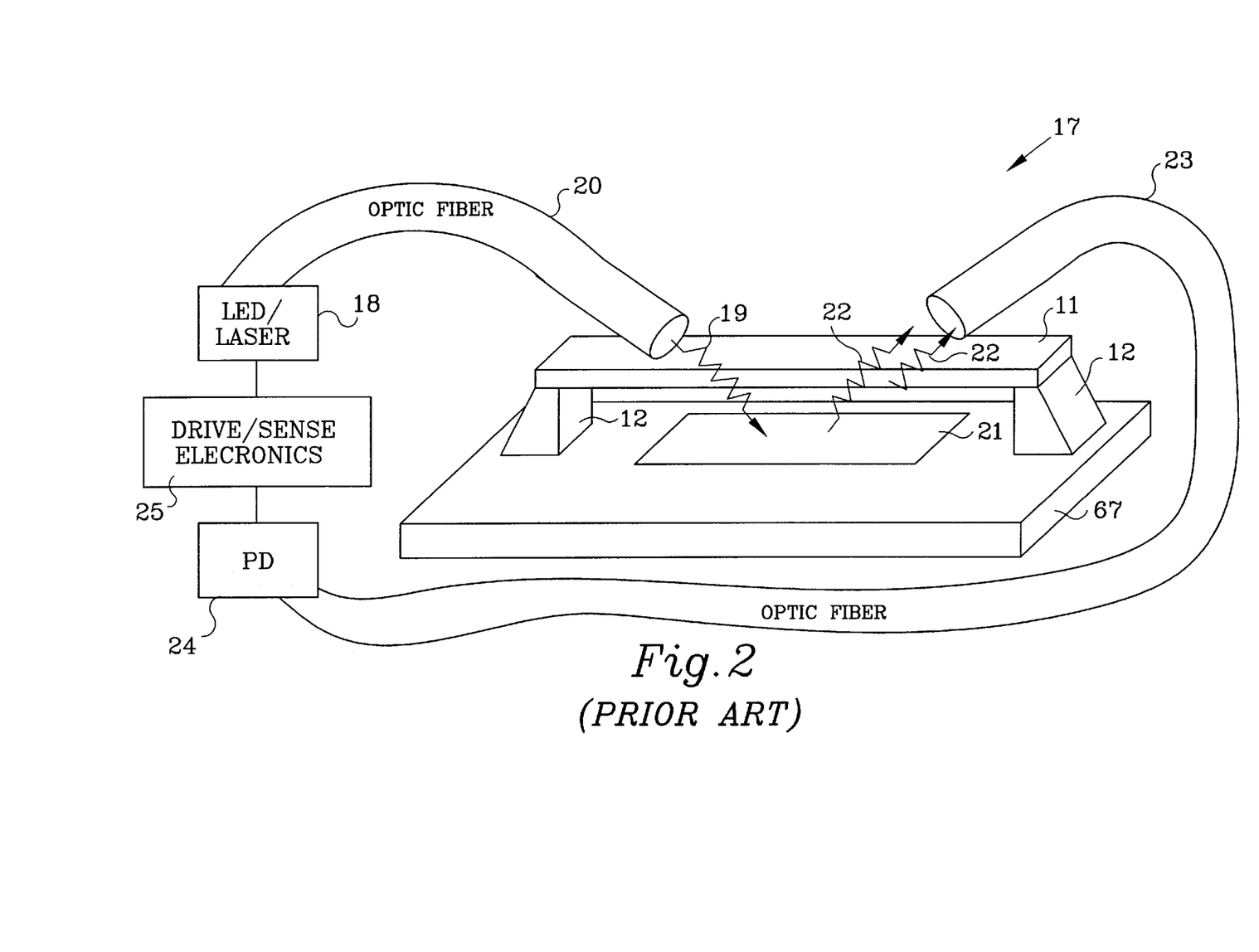
FIG. 2 shows a conventional optical RIMS sensor.

Besides the electrical RIMS system 16, there is also an optical RIMS 17 that is also similarly inadequate for sensing parameters in high temperature environments. Similarly, system 17 has a resonant beam 11 held by supports 12 which are a part of a micromachined integrated silicon device. A light emitting diode (LED) or laser 18 emits light 19 via optical fiber 20 through beam 11 onto a photo diode 21 which is situated beneath beam 11. When photo diode 21 receives light 19, it generates an electrical charge which then electrostatically attracts beam 11 thereby causing it to vibrate at its natural frequency. Light 22 is reflected off of photo diode 21 and beam 11 and is transmitted via fiber 23 to a photo diode 24 which is connected to drive/sense electronics 25. Electronics 25 processes light signals 22 for determining the actual vibrating frequency of the resonant beam, which is a comparison of signals 22 and determination of the beat frequency between signals 22 reflected from photo detector 21 and beam 11, respectively, and also for determining and providing an appropriate drive signal to maintain the vibration of the beam. This system 17 also is incapable of functioning under high temperature environments. For example, photo diodes fail at temperatures less than 250 degrees C.

SUMMARY OF THE INVENTION

Present invention uses neither piezoelectric sensing nor photo diode driving as in the above-noted electrical and optical RIMS sensors, respectively.

Figures 7, 8:
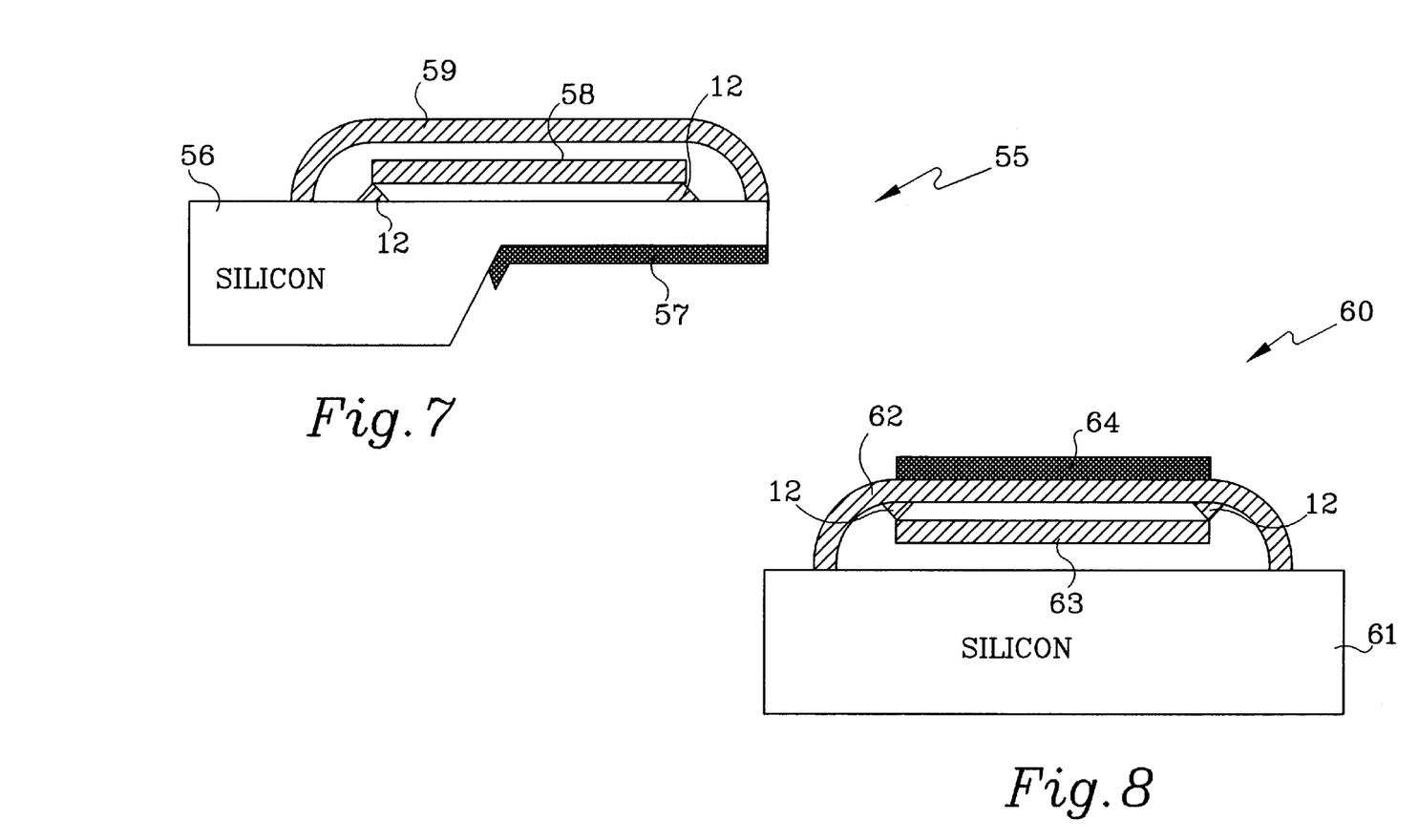
FIG. 7 illustrates a cantilevered bimorph RIMS sensor.
FIG. 8 illustrates a shell-coupled bimorph RIMS sensor.

The invention may be used in various high temperature environments such as jet engines, deep (geothermally heated) wells and process controls. The high temperature RIMS standard configuration sensor may be used for strain displacement having a sensitivity of about fifty picostrains and a displacement sensitivity down to approximately ¹/₁₀,₀₀₀ of an angstrom. The invention may be used as a pressure sensor for differential, absolute or gauge sensing of flow level and/or acoustic parameters. The sensitivity and accuracy of such pressure sensor may be as good as two parts per million (ppm) of the span of pressure measurement. A cantilever version of the high temperature microbeam sensor may be used for force, weight, and/or torque measurements. The cantilever version of the sensor may implement bimorph thin films, as shown in FIGS. 7 and 8, for the measurement of temperature, magnetic fields, humidity and VOC's (i.e., volatile organic compounds). This version may be used, respectively, with thermal expansion miss-match, magnetostriction (nickel, Fe—Co, terfinol, etc.), and organic or inorganic films that absorb moisture or swell selectively with VOC's. The high temperature RIMS configuration may be used as an accelerator for sensing the acceleration, inclination (tilt), and vibration (spectral noise). The accelerometer version has a near micro-g sensitivity and stability. The sensor may also have a photo diode proximate to the beam or shell. It may be a type of sensor used for measuring light, doing spectral and/or chemical analyses. With narrow bandpass optical (including ultraviolet and infrared) filters and an array RIMS-based detectors, a wide range of chemical analyses can be performed. Often techniques in conjunction with the electronics can be used to further increase sensitivity. The electrical drive and optical sense RIMS sensor configuration may be used in ultra-high temperature (about 600 degrees C.) for all of the above-noted kinds of measurements. In the polysilicon version, the beam is functional up to the plastic flow of the polysilicon. Higher temperature sensors may use metal for the beam and sapphire for the die and beam shell. Optical fiber may be brought close to the sensor for both capacitively driving the beam and for sensing the natural frequency of the beam.

DESCRIPTION OF PREFERRED EMBODIMENTS

Figure 3:
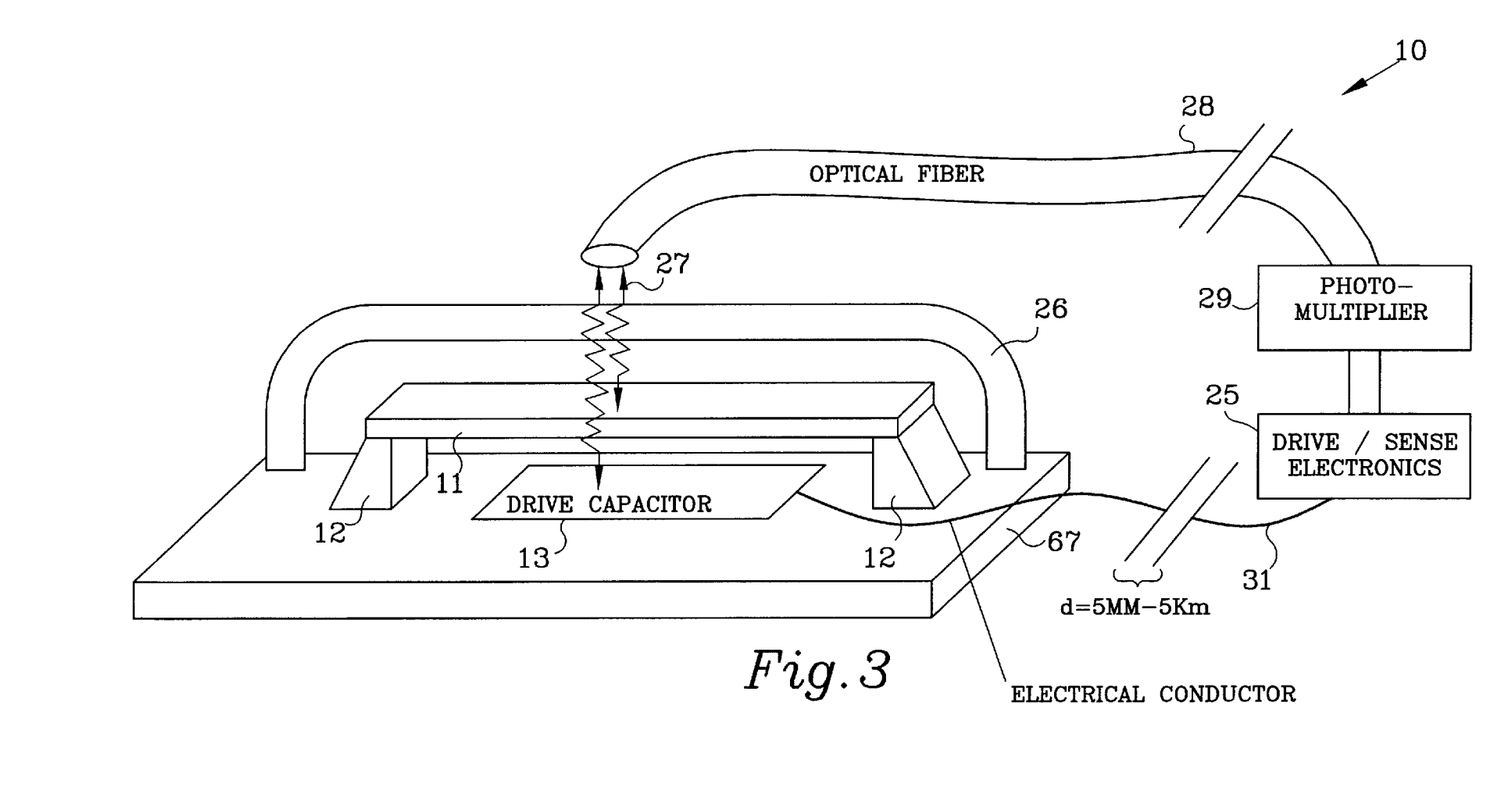
FIG. 3 reveals a hybrid electrical/optical RIMS sensor for very high temperature environments.

One embodiment of the invention is shown in FIG. 3. Resonant microbeam 11 is supported by posts 12. Beam 11 is electrostatically driven by drive capacitor 13 which is connected via an electrical conductor 31 to drive sense electronics 25. The length of conductor 31 may vary from 5 millimeters to 5 kilometers. Microbeam 11 is covered and sealed by a polysilicon shell 26. Incidentally, microbeam 11 and posts 12 are also micromachined from polysilicon which together form an integrated silicon device. Light 27 is transmitted from fiber 28 on through shell 26 and partially on through beam 11 to capacitor 13. Light 27 is reflected from beam 11 and capacitor 13 back through shell 26 on into fiber 28 which is connected to photo multiplier 29. A beat frequency of reflected light 27 from beam 11 and capacitor 13 indicates the frequency of vibration of beam 11. The electrical output of photo multiplier 29 goes to drive/sense electronics 25 of system 10.

Dielectrically isolated drive capacitor 13 functions well at very high temperatures. Likewise, the optical sensing which involves the reflection of light 27 from surfaces of beam 11 and capacitor 13, functions well at very high temperatures. The limitations of this hybrid electrical/optical RIMS sensor 10 become apparent when the plastic flow temperature of the polysilicon of beam 11 is reached. Such condition limits the beam's mechanical stability at temperatures above approximately 600 degrees C.

Drive/sense electronics 25 of system 10 provides an appropriate drive signal to vibrate beam 11 at its natural frequency. Signals sensed from beam 11 as light 27 via fiber 28 goes to photo multiplier 29 which converts light 27 signals into electrical signals to electronics 25 which are processed to indicate the actual frequency of beam 11. The parameters measured by beam 11 are sensed via the distance between posts 12 which either stretch or contract beam 11 thereby affecting its resonant frequency which is an indication of a particular parameter value.

Figure 4:
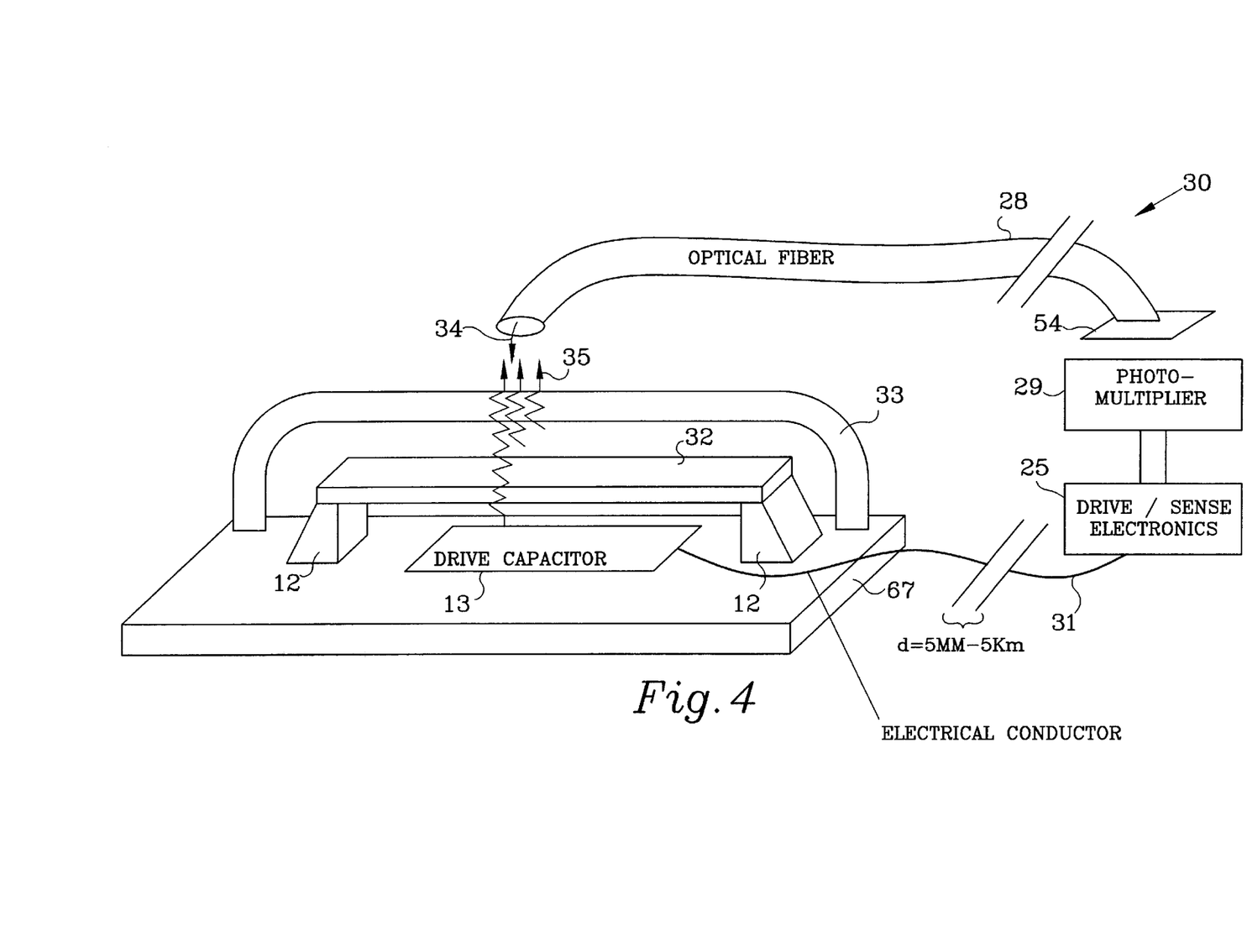
FIG. 4 reveals a hybrid electrical/optical RIMS sensor for ultra high temperature environments.

FIG. 4 reveals embodiment 30 of an electrical/optical RIMS sensor for ultra-high temperatures from 500–1000 degrees C. Two significant features that increase the temperature capabilities of system 30 over those of system 10 of FIG. 3 are the materials used in the micromachined integrated device. For instance, the resonant microbeam 32 is made of a metal such as tungsten. Shell 33, the substrate and posts 12 are made of sapphire (i.e., $Al_2O_3$) or other like materials. Resonant microbeam 32 is electrostatically driven by drive capacitor 13 via an electrical conductor 31 carrying a drive signal from drive/sense electronics 25. Conductor 31 length again may vary from 5 millimeters to 5 kilometers, depending on the practicalities of the arrangement of system 30. A particular natural frequency of beam 32, after being driven by capacitor 13, depends upon the material and dimensions of beam 32 and whether beam 32 is contracted or stretched by posts 12 in accordance with the parameter that is being measured by the device upon which the RIMS and cap sensor is situated on.

To sense the natural frequency of beam 32, a light 34 may come from optical fiber 28 on through shell 33 into beam 32. Light 35 then is reflected back into optical fiber 28 from beam 32, drive capacitor 13 and/or shell 33, onto photo multiplier or diode 29. At temperatures of 600° C. and up, no light 34 is needed to illuminate beam 32, as the beam is at a high enough temperature to be a very good infrared emitter and thus is a source of light which is transmitted through shell 33 on into fiber 28. Shell 33 is partially reflective and partially transparent to infrared light. Light 35 passes through infrared filter 33 and onto photo multiplier or diode 29 to be converted into electrical signals. Electrical signals from device 29 are sent on to drive/sense electronics 25 which processes the signals to indicate the frequency of beam 32 and in turn the parameter value that system 30 is sensing. The sensed signal enables drive electronics 25 to provide the appropriate signal to the drive capacitor for keeping beam 32 in vibration at its natural frequency.

Figure 5:
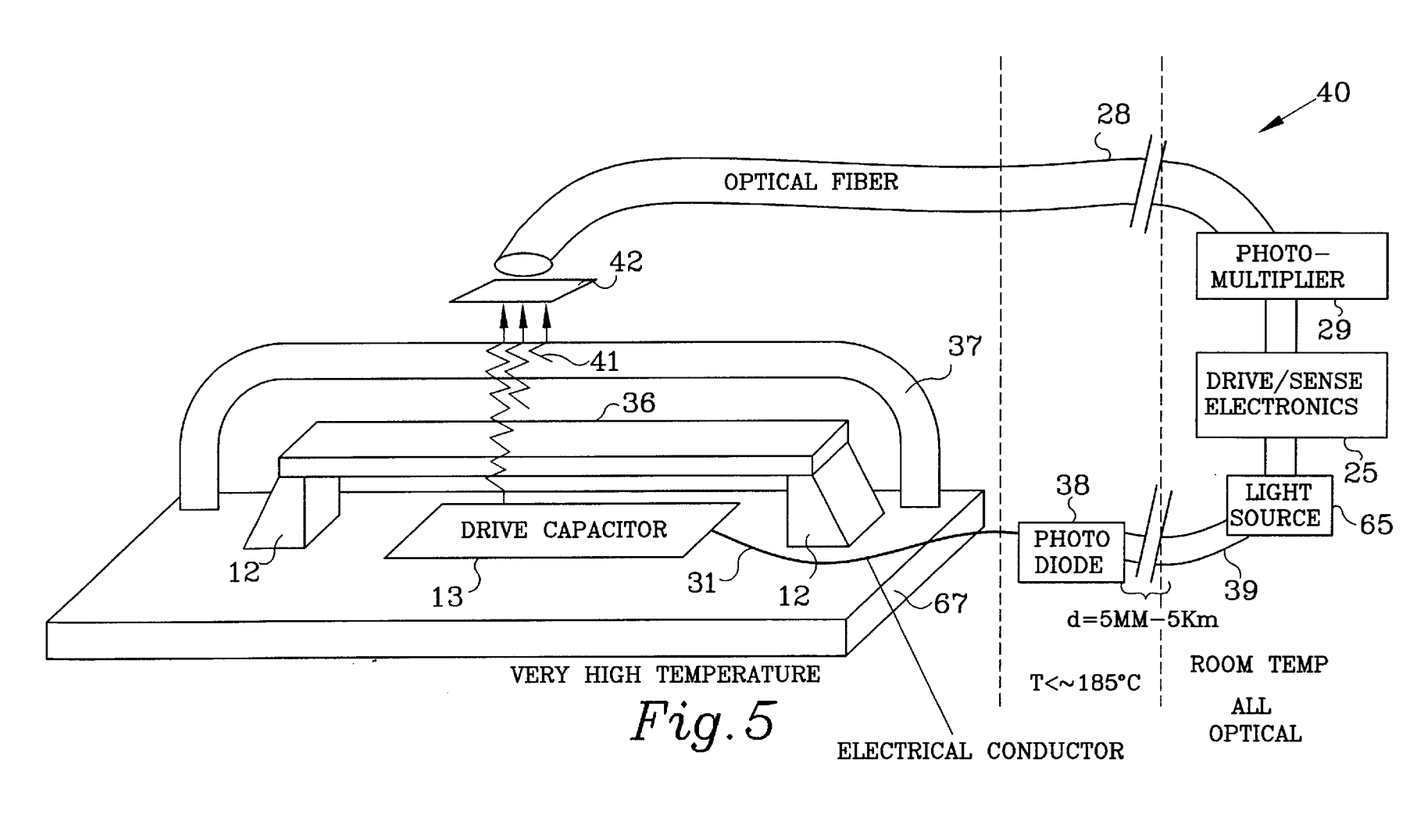
FIG. 5 reveals an optical RIMS sensor for very high temperature environments.

FIG. 5 reveals a quasi-all optical RIMS sensor system 40 for very high temperature environments. The feature of system 40 is that all distant communication between the drive/sense electronics 25 and the microbeam sensor 36 is via optical fibers 28 and 39. This fiber configuration may be used also in configurations 10 and 30 of FIGS. 3 and 4, respectively.

Shell 37 of system 40 is a poor black-body emitter and is transparent to infrared light. Microbeam 36 is partially reflective and partially transparent to infrared light. The substrate is a good black-body emitter. Drive/sense electronics 25 sends out a drive signal via a LED or laser light source in form of a light signal through optical fiber 39 which is connected to photo diode 38. The length of optical fiber 39 may vary from 5 millimeters to 5 kilometers. The advantage of using the optical fiber over long distances is to avoid signal-to-noise ratio problems that arise with respect to transmission of electrical signals down long conductors. Photo diode 38 is physically close to sensor microbeam 36 but is distant enough to remain in an environment that has a temperature preferably less than 185 degrees C. Conductor 31 takes electrical drive signal from photo diode 38 to drive capacitor 13 which electrostatically drives microbeam 36 into vibration at its natural frequency.

Detection of beam 36 occurs with infrared light from substrate as a black-body emitter through beam 36 and shell 37. Light 41 is filtered by infrared filter 42 and enters optical fiber 28 to be fed back to photo multiplier or diode 29 where the sense signal is converted into electrical signal. This electrical signal is sent to drive/sense electronics 25. Electronics 25 processes the electrical signal from photo detector 29 into an indication of a natural resonance frequency which in turn is converted into a parameter value being measured by microbeam 36 due to contraction or stretching by posts 12 which are a part of micromachined integrated device which is part of an apparatus involved in parameter sensing.

Figure 6:
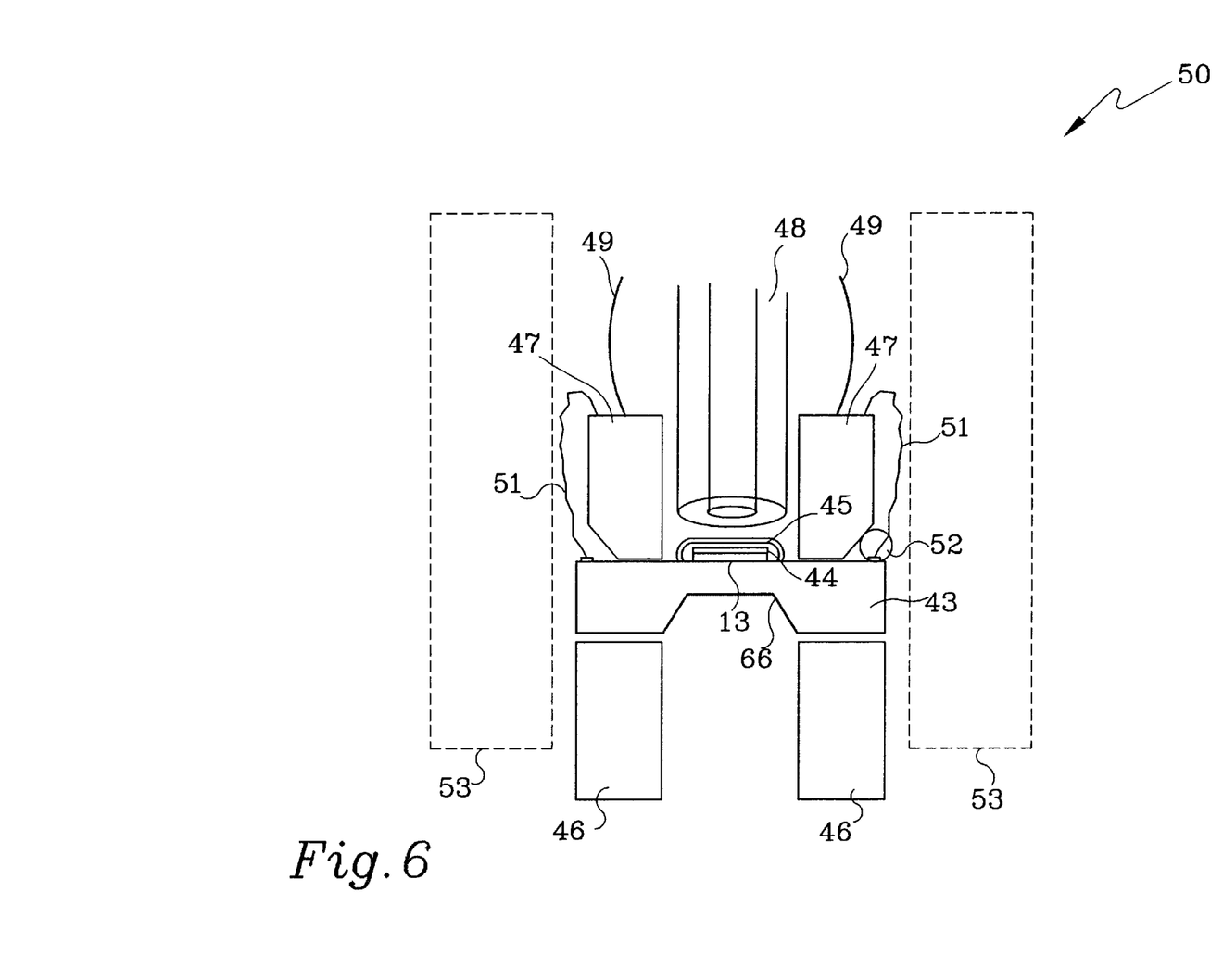
FIG. 6 shows a RIMS sensor assembly.

FIG. 6 reveals an embodiment of the invention incorporated into a packaged implementation 50. On silicon die 43 is a micromachined microbeam 44 and shell 45. Silicon die 43 has a PYREX tube 46 (or of other like material) which TE-bonded to it. Backside 47 is die-coated with $Al_2O_2$. On the other side of silicon die 43 is PYREX tube 47 which is TE-bonded to it. Optical fiber 48 is inserted into the opening of PYREX tube 47. Leads 49 are attached to device 50 with wire bonds 51 to silicon die 43. Wired bonds 51 are ultimately connected to drive capacitor 13 situated in silicon die 43 proximate to microbeam 44 which is supported by posts 12. Parameters to be measured, such as pressure, are sensed via tube 46 and affect silicon die 43 in the form of bending which in turn is sensed by microbeam 44 in the form of contraction or expansion thereby affecting the natural frequency of beam 44. Beam 44 is driven electrostatically by capacitor 13 which receives drive signals via wires 49 and wire bonds 51 from external electronics 25. Light may be brought in via optical fiber 48 for sensing the natural frequency of beam 44, or silicon die 43 may be a source of such light for sensing. The sensed light is conveyed from beam 44 through optical fiber 48 to drive/sense electronics 25. Wires 49 for drive capacitor 13 may be connected to drive/sense electronics 25 or may be connected to electronics 25 via a photo diode 38 and optical fiber 39 as shown by way of example in FIG. 5. Various notches on tube 47 near die 43 may be filled with high temperature cement 52. Flexible cladding 53 surrounds the entire structure of apparatus 50 for mounting purposes and/or environmental concerns. Device 50 is a configuration that is likely used for pressure sensing.

FIG. 7 shows the cantilevered bimorph RIMS microbeam sensor 55. Silicon cantilever 56 has a magnetostrictive film 57 adhered to it. Any change of dimension of the magnetostrictive film due to a parameter measurement, such as that of a magnetic field, affects silicon cantilever 56 by causing to bend one way or the other and thereby posts 12 cause beam 58 to either contract or expand as a result of the sensing of the parameter by film 57. The natural frequency of beam 58 is sensed in the various manners of FIGS. 3–5, as discussed above. Vacuum shell 59 is formed over RIMS beam 58. Film 57 may be of other substances that are sensitive to temperature, humidity and/or VOC's.

FIG. 8 reveals a shell-coupled bimorph configuration 60 of a sensor incorporating the present invention. Silicon substrate 61 supports the vacuum shell 62. Formed on vacuum shell 62 are posts 12 which support RIMS beam 63. Formed on the other side of shell 62 is magnetostrictive film 64 which may change in dimension relative to a particular parameter, such as that of a magnetic field, that is being measured. This change in dimension of film 64 distorts shell 62 which in turn via posts 12 either contracts or expands beam 63 thereby affecting the natural frequency of beam 63. Film 64 may be of other substances that are sensitive to temperature, humidity and/or VOC's. Beam 63 is driven and sensed by techniques and devices described above, and the resulting signals are processed by electronics to provide indications of natural frequencies thereby indicating various values of the parameters measured.

I claim:

1. A high temperature resonant microbeam sensor comprising:

a resonant beam;

a drive capacitor proximate to said resonant beam;

an optical fiber having an end proximate to said resonant beam;

wherein:

said drive capacitor is for electrostatically driving said resonant beam into vibration; and said optical fiber is for illuminating said resonant beam and for receiving light reflected by said resonant beam.

2. The microbeam sensor of claim 1 wherein:

said resonant beam is micromachined from polysilicon; and said resonant beam is contracted or stretched according to a parameter being sensed, and thereby has a change in resonant frequency.

3. The microbeam sensor of claim 2 wherein:

said optical fiber is connected to a light source and a photo detector;

said drive capacitor is connected via an electrical conductor to a drive/sense electronics; and the photo detector is connected to the drive/sense electronics.

4. The microbeam sensor of claim 3 wherein the photo detector and drive/sense electronics are thermally removed via said optical fiber and the electrical conductor from any high temperature environment of the microbeam sensor.

5. The microbeam sensor of claim 4 wherein the high temperature environment has a high temperature limit of about 600° C. which is limited by the mechanical stability of said resonant beam due to the plastic flow temperature of polysilicon.

6. The microbeam sensor of claim 5 further comprising a polysilicon shell formed over said resonant beam.

7. The microbeam sensor of claim 6 wherein said resonant beam and polysilicon shell are formed on a silicon substrate.

8. The microbeam sensor of claim 7 wherein the silicon substrate is a cantilevered substrate.

9. An ultra high temperature resonant microbeam sensor comprising:

microbeam situated on a substrate;

a drive capacitor situated in the substrate proximate to said microbeam; and an optical fiber having an end proximate to said microbeam; and wherein:

said beam is of a metal;

the resonant microbeam sensor functions in an environment of ultra high temperatures; and an ultra high temperature is between 500 and 1000 degrees C.

10. The microbeam sensor of claim 9 wherein:

said substrate has a plastic flow property greater than 1000 degrees C.; and said microbeam functions as an infrared light emitter at temperatures greater than 600 degrees C.

11. The microbeam sensor of claim 10 wherein:

the natural frequency of the microbeam is affected by a parameter being measured; and said optical fiber is for receiving light from said microbeam.

12. The microbeam sensor of claim 11 wherein:

said optical fiber is connected to a photo detector in an environment having temperatures below about 250 degrees C.;

said electrical conductor is connected to a drive/sense electronics; and the photo detector is connected to the drive/sense electronics.

13. The microbeam sensor of claim 12 wherein:

light from said microbeam is connected to electrical signals by the photo detector; and the electrical signals are processed by the drive/sense electronics into indications of the frequency of the microbeam which corresponds to a parameter measurement.

14. The microbeam sensor of claim 13 further comprising an infrared filter situated between said optical fiber and the photo detector.

15. The microbeam sensor of claim 14 further comprising a shell formed over the microbeam on said substrate.

16. The microbeam sensor of claim 15 wherein:

said microbeam is of tungsten;

said substrate is of $Al_2O_3$; and said shell is of $Al_2O_3$.

17. A very high temperature resonant microbeam sensor comprising:

a microbeam formed on a substrate;

a drive capacitor situated proximate to said microbeam;

a first optical fiber having a first end proximate to said microbeam;

an electrical conductor connected to said drive capacitor;

a first photo detector connected to said electrical conductor; and a second optical fiber having a first end connected to said first photo diode; and wherein:

the microbeam sensor is situated in an environment having temperatures up to 600 degrees C.;

the microbeam has a resonant frequency which is indicative of a value of a parameter being measured; and said first photo detector is in an environment that has temperatures less than 250 degrees C.

18. The resonant microbeam sensor of claim 17 further comprising:

a second photo detector connected to a second end of said first optical fiber; and a drive/sense electronics connected to said first and second photo detectors, wherein said electronics determines a frequency of vibration of said microbeam from signals of said first photo diode and provides drive signals to said second photo diode.

19. The resonant microbeam sensor of claim 18 further comprising a shell formed over said microbeam on the substrate.

20. The resonant microbeam sensor of claim 19 wherein:

said substrate is a black-body emitter;
of infrared light through said microbeam providing a signal indicative of frequency of said microbeam into the first end of said first optical fiber;

said microbeam is partially reflective and partially transparent to infrared light; and said shell is transparent to infrared light and is a poor black-body emitter.

21. The resonant microbeam sensor of claim 20 further comprising an infrared filter situated on the first end of said first optical fiber.

22. The resonant microbeam sensor of claim 21 wherein said drive/sense electronics indicates the value of the parameter being measured.

* * * * *